United States Patent
Jeon et al.

(10) Patent No.: US 9,428,671 B2
(45) Date of Patent: Aug. 30, 2016

(54) STARCH-BASED HOT MELT ADHESIVE

(75) Inventors: Young Seong Jeon, Seoul (KR); Se Na Lee, Incheon (KR); Jee Young Yoon, Seoul (KR); Jun Soo Lee, Incheon-si (KR); Ssang Ok Kim, Seoul (KR)

(73) Assignee: Daesang Corporation, Seoul (KR)

( * ) Notice: Subject to any disclaimer, the term of this patent is extended or adjusted under 35 U.S.C. 154(b) by 145 days.

(21) Appl. No.: 14/369,418

(22) PCT Filed: Aug. 10, 2012

(86) PCT No.: PCT/KR2012/006366
§ 371 (c)(1),
(2), (4) Date: Oct. 24, 2014

(87) PCT Pub. No.: WO2013/100301
PCT Pub. Date: Jul. 4, 2013

(65) Prior Publication Data
US 2015/0045480 A1    Feb. 12, 2015

(30) Foreign Application Priority Data

Dec. 28, 2011 (KR) .................. 10-2011-0144364

(51) Int. Cl.
| | |
|---|---|
| *C09J 103/02* | (2006.01) |
| *C09J 123/08* | (2006.01) |
| *C09J 131/04* | (2006.01) |
| *C09J 11/04* | (2006.01) |
| *C09J 201/00* | (2006.01) |
| *C09J 11/08* | (2006.01) |

(52) U.S. Cl.
CPC .............. *C09J 103/02* (2013.01); *C09J 11/04* (2013.01); *C09J 11/08* (2013.01); *C09J 123/0853* (2013.01); *C09J 131/04* (2013.01); *C09J 201/00* (2013.01)

(58) Field of Classification Search
CPC ........ C09J 103/02; C09J 11/04; C09J 11/08; C09J 123/0853; C09J 131/04; C09J 201/00; C08L 31/04

USPC .......................................................... 524/47
See application file for complete search history.

(56) References Cited

U.S. PATENT DOCUMENTS 5,434,201 A    7/1995   Neigel et al.

FOREIGN PATENT DOCUMENTS

| JP | 2732819 B2 | 12/1997 |
|---|---|---|
| JP | 4439807 B2 | 1/2010 |
| KR | 100160860 B1 | 12/1998 |
| KR | 1020080093733 A | 10/2008 |
| KR | 2012046450 A * | 5/2010 |
| WO | 2010056270 A1 | 5/2010 |

OTHER PUBLICATIONS

KR 10-2012-0046450 A (2010), machine translation, KIPO Korean Intellectual Property Rights Information Service (KIPRIS).*

* cited by examiner

*Primary Examiner* — Susannah Chung
*Assistant Examiner* — Josephine Chang
(74) *Attorney, Agent, or Firm* — The Webb Law Firm

(57) ABSTRACT

An exemplary embodiment of the present invention provides starch-based hot melt adhesive comprised of a composition including starch, a thermoplastic polymer, a tackifier, a plasticizer, and an adhesion promoter. The hot melt adhesive according to the exemplary embodiment of the present invention contains about 25 to 55 weight % of the starch which is infinitely renewable biomass, and, thus, it is less harmful and more eco-friendly and has a reduced manufacturing costs and is less sensitive to exhaustion of petroleum-based resources, as compared with the conventional hot melt adhesive mainly containing a petroleum-based material. Further, the hot melt adhesive according to the exemplary embodiment of the present invention imparts excellent adhesion strength and workability at the time of adhesion between different kinds of adherends such as a hydrophobic adherend and a hydrophilic adherend and can be applied to various fields such as packaging, bookbinding, construction, woodworking, and textile fields.

12 Claims, 2 Drawing Sheets

STARCH-BASED HOT MELT ADHESIVE

CROSS-REFERENCE TO RELATED APPLICATIONS

This application is the United States national phase of International Application No. PCT/KR2012/006366 filed Aug. 10, 2012, and claims priority to Korean Patent Application No. 10-2011-0144364 filed Dec. 28, 2011, the disclosures of which are hereby incorporated in their entirety by reference.

TECHNICAL FIELD

The present invention relates to a starch-based hot melt adhesive, and particularly, to a starch-based hot melt adhesive that contains starch in a certain amount or more and imparts excellent adhesion strength and workability at the time of adhesion between different kinds of adherends such as a hydrophobic adherend and a hydrophilic adherend.

BACKGROUND ART

Adhesion refers to the state in which two surfaces are held together by attraction between molecules, atoms, and ions, and an adhesion phenomenon has been widely applied, from daily necessities such as tape, glue, and the like, to an automobiles and state-of-the-art semiconductor devices, in our lives. In recent years, along with remarkable development of industry, there have been various demands for adhesive from various fields.

Polymer adhesive can be classified into chemically reactive adhesive, solvent-based adhesive and hot melt adhesive depending on a solidification process. The hot melt adhesive of them is easy to use and is a representative example that can satisfy the recently emerging requirements for environment.

The hot melt adhesive is a material in a solid state at room temperature and is not dissolved or dispersed in a solvent, and it is used in a liquid state by melting only 100% solids with heat. The hot melt adhesive has illustrated a high growth rate as compared with the existing solvent-based adhesive due to its advantages of high productivity caused by process automation, eco-friendly characteristics, a wide range of applicability, a re-adhesion possibility, and the like, since DuPont first developed an ethylene-vinyl acetate (EVA) resin in 1960s. The hot melt adhesive is coated on an adherend surface while being in a molten state and is cooled and solidified by giving off heat to and around the adherend surface. The hot melt adhesive requires a small working space and has high-speed adhesion without a drying process as compared with other solvent-based adhesive or water dispersed adhesive. High-speed adhesion of the hot melt adhesive enables automation of a production line and an increase in productivity, and, thus, the hot melt adhesive has considerable economic advantages such as improvement in productivity, reduction of labor costs, reduction of an amount of material caused by regulation of spread, and the like. The hot melt adhesive has been applied to various fields such as packaging, bookbinding, construction, woodworking, automobile, textile, and electrical/electronic fields.

The conventional commercial hot melt adhesive is generally classified into ethylene-vinyl acetate-based adhesive, polyolefin-based adhesive, styrene block copolymer-based adhesive, polyamide-based adhesive, polyester-based adhesive, and urethane-based (reactive hot melt) adhesive depending on a basic resin used therein. The basic resin highly affects adhesion strength and cohesion strength, which are the most important properties of the hot melt adhesive. The conventional commercial hot melt adhesive contains a mainly petroleum-based material as a basic resin and thus is not sufficient in eco-friendly characteristics, and has a problem that manufacturing costs can be increased due to external causes such as instability in petroleum-based material supply and demand, exhaustion of petroleum-based materials, and the like. Therefore, considering eco-friendly characteristics, a stable supply of materials, and a gradual increase in production cost, it is necessary to replace the whole or part of a basic resin, as a major constituent of the hot melt adhesive, with infinitely renewable biomass, particularly starch.

Meanwhile, generally, a furniture board mainly made of wood is banded with finishing materials made of PVC, polypropylene, or ABS in order to improve an aesthetic feeling of a surface of the furniture board. When the furniture board is banded with the finishing materials, a finishing material bander called "edge bander" is used. The edge bander refers to a device for bonding an edge to a corner portion of the furniture board for improvement in the beauty of the furniture board. When a board such as plywood is cut and hot melt adhesive melt with heat (170 to 200° C.) in an adequate amount is coated on its cut surface, the edge bander is used to bond an edge made of a synthetic resin to the cut surface. FIG. 1 illustrates one of general using forms of hot melt adhesive and illustrates a status where a wood board and an edge are bonded to each other with hot melt adhesive. Herein, the wood board as an adherend is mainly hydrophilic and the edge is mainly hydrophobic. Thus, even if a considerable amount of a basic resin as a major constituent of hot melt adhesive is replaced with starch, the hot melt adhesive needs to increase adhesion strength between adherends having different properties. Further, in order to secure workability of hot melt adhesive, an increase in viscosity of the hot melt adhesive according to an increase in starch content needs to be regulated to an optimal level.

DISCLOSURE

Technical Problem

The present invention is conceived to solve the conventional problem. An object of the present invention is to provide starch-based hot melt adhesive that contains starch in a certain amount or more and imparts excellent adhesion strength and workability at the time of adhesion between different kinds of adherends such as a hydrophobic adherend and a hydrophilic adherend.

Technical Solution

According to an exemplary embodiment, there is provided starch-based hot melt adhesive comprised of a composition including starch, a thermoplastic polymer, a tackifier, a plasticizer, and an adhesion promoter. Herein, the starch is contained in an amount of 25 to 55 weight % with respect to the total weight of the composition. Further, the thermoplastic polymer is contained in an amount of 20 to 150 parts by weight with respect to 100 parts by weight of the starch and includes at least one selected from the group consisting of an Ethylene Vinyl Acetate (EVA) copolymer, polyvinyl acetate, polyvinyl alcohol, an ethylene-acrylic acid copolymer, and an ethylene-methacrylic acid copolymer. Furthermore, the tackifier is contained in an amount of 25 to 125 parts by weight with respect to 100 parts by weight of the starch. Also, the plasticizer is contained in an amount of 10 to 40 parts by weight with respect to 100 parts by weight of the starch. Moreover, the adhesion promoter is contained in an amount of 0.1 to 10 parts by weight with respect to 100 parts by weight of the starch and includes at least one selected from the group consisting of polyacrylamide, polyvinylamide, polyethyleneimine, epoxidized polyamide, and glyoxylated polyacrylamide.

Advantageous Effects

The hot melt adhesive according to the exemplary embodiment of the present invention contains about 25 to 55 weight % of the starch which is infinitely renewable biomass, and, thus, it is less harmful and more eco-friendly and has a reduced manufacturing costs and is less sensitive to exhaustion of petroleum-based resources, as compared with the conventional hot melt adhesive mainly containing a petroleum-based material. Further, the hot melt adhesive according to the exemplary embodiment of the present invention imparts excellent adhesion strength and workability at the time of adhesion between different kinds of adherends such as a hydrophobic adherend and a hydrophilic adherend and can be applied to various fields such as packaging, bookbinding, construction, woodworking, and textile fields.

DESCRIPTION OF DRAWINGS

In FIGS. 2 to 6, the left photo shows a wood-based particle board and the right photo shows an ABS edge.

BEST MODE

Figure 1:
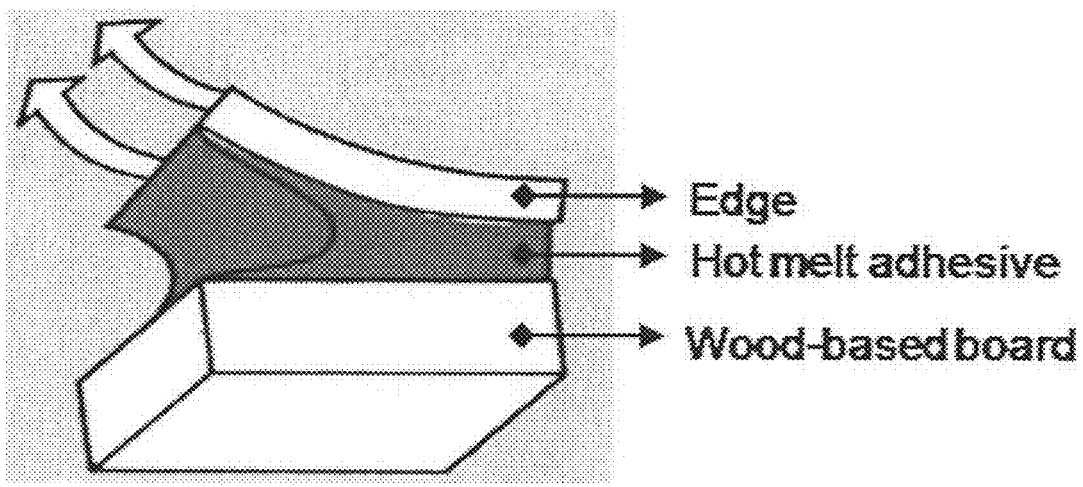
FIG. 1 illustrates one of general using forms of hot melt adhesive and illustrates a status where a wood board and an edge are bonded to each other with hot melt adhesive.

The present invention relates to starch-based hot melt adhesive, and starch-based hot melt adhesive according to an exemplary embodiment of the present invention is comprised of a composition including starch, a thermoplastic polymer, a tackifier, a plasticizer, and an adhesion promoter, and preferably, may further contain a supplement additive. Hereinafter, the starch-based hot melt adhesive according to the exemplary embodiment of the present invention will be divided into constituents and explanation thereof will be provided.

Starch

The hot melt adhesive according to the exemplary embodiment of the present invention contains starch in an amount of about 25 to 55 weight %, preferably about 30 to 50 weight %, and more preferably about 35 to 45 weight % with respect to the total weight of the composition. If the starch is contained in an amount of less than 25 weight %, adhesion strength may be decreased to less than a level required for hot melt adhesive in the field. If the starch is contained in an amount of more than 55 weight %, melt viscosity is highly increased, which may deteriorate workability.

The starch is not specifically limited in kind and may include, for example, corn starch, waxy corn starch, tapioca starch, potato starch, sweet potato starch, rice starch, wheat starch, and the like. Further, the starch includes unmodified starch or specific modified starch, and preferably may be unmodified starch considering adhesion strength, workability, and manufacturing costs of hot melt adhesive. The unmodified starch is obtained from a typical starch manufacturing process and is a concept contrary to modified starch (for example, acid modified starch, oxidized starch, acetylated distarch adipate, acetylated distarch phosphate, starch sodium octenyl succinate, distarch phosphate, monostarch phosphate, phosphated distarch phosphate, starch acetate, hydroxypropyl distarch phosphate, hydroxypropyl starch, and the like.) modified in properties (viscosity, thermo stability, free-thaw stability) by a chemical treatment and a thermal treatment. Examples of the specific modified starch used in the composition for the hot melt adhesive according to the present invention may include acid modified starch, oxidized starch, starch acetate, or starch octenyl succinate, and the like. In view of the foregoing description, the starch according to the present invention may include at least one selected from the group consisting of unmodified starch, acid modified starch, oxidized starch, starch acetate, and starch octenyl succinate.

Thermoplastic Polymer

A thermoplastic polymer has a function of regulating adhesion strength and cohesion strength of the hot melt adhesive, and the thermoplastic polymer used in the present invention is not specifically limited in kind as long as it contains a vinyl group or a hydroxyl group, and may include, for example, at least one selected from the group consisting of an Ethylene Vinyl Acetate (EVA) copolymer, polyvinyl acetate, polyvinyl alcohol, an ethylene-acrylic acid copolymer, and an ethylene-methacrylic acid copolymer.

The hot melt adhesive according to the exemplary embodiment of the present invention contains the thermoplastic polymer in an amount of about 20 to 150 parts by weight, preferably about 30 to 110 parts by weight, and more preferably about 40 to 100 parts by weight with respect to 100 parts by weight of the starch. If the thermoplastic polymer is contained in an amount of less than 20 parts by weight, melt viscosity of the hot melt adhesive may be highly increased, which may deteriorate workability, which makes it difficult to actually work with. Further, if the thermoplastic polymer is contained in an amount of more than 150 parts by weight, adhesion strength of the hot melt adhesive may be decreased to less than a level required for hot melt adhesive in the field.

Plasticizer

A plasticizer is used to impart flexibility and an adhesive property to a polar polymer. The plasticizer according to the present invention is not specifically limited in kind and may include, for example, at least one selected from the group consisting of sorbitol, ethylene glycol, glycerin, glycerin diacetate, and pentaerythritol.

The hot melt adhesive according to the exemplary embodiment of the present invention contains the plasticizer in an amount of about 10 to 40 parts by weight, preferably about 20 to 40 parts by weight, and more preferably about 20 to 35 parts by weight with respect to 100 parts by weight of the starch. If the plasticizer is contained in an amount of less than 10 parts by weight, an effect caused by addition of the plasticizer may be insignificant and melt viscosity of the hot melt adhesive may be highly increased, which makes it difficult to actually work with. Further, if the plasticizer is contained in an amount of more than 40 parts by weight, economic advantages may deteriorate due to excessive use of the plasticizer and the amount of the thermoplastic polymer is relatively decreased, which may deteriorate the overall property of the hot melt adhesive.

Tackifier

If hot melt adhesive is just comprised of starch, a thermoplastic polymer, and a plasticizer, when the hot melt adhesive is melt and coated, hot-tack and wetting are poor and melt viscosity is high, which makes it difficult to work with. Therefore, the hot melt adhesive according to the present invention further contains a tackifier.

In the hot melt adhesive according to the exemplary embodiment of the present invention, the tackifier is a low molecular resin, and when the tackifier is used in a mixture with starch and a thermoplastic polymer as basic constituents, it can lower melt viscosity and thus improve workability, and in some cases, it may impart a functional group and thus can improve wetting in the initial stage of adhesion and adhesion strength on an adherend surface of the hot melt adhesive and also regulate a time for solidification.

The tackifier used in the hot melt adhesive according to the exemplary embodiment of the present invention is not specifically limited in kind and may include a rosin-based tackifier, a terpin resin, a cumarone inden resin, a petroleum resin, and the like, and preferably may be a petroleum resin. To be more specific, the tackifier may include at least one selected from the group consisting of an aliphatic hydrocarbon resin, a cycloaliphatic hydrocarbon resin, an aromatic hydrocarbon resin, an aromatic modified aliphatic hydrocarbon resin, and a hydrogenated hydrocarbon resin. The aliphatic hydrocarbon resin of the tackifier according to the present invention may include Hikorez A-1100, Hikorez A-1100S, Hikorez C-1100, Hikorez R-1100, Hikorez R-1100S, and the like, commercially available from Kolon Chemical (Korea). Further, the cycloaliphatic hydrocarbon resin may include a hydrocarbon resin containing dicyclopentadiene (DCPD) as a monomer and is described in Korean Patent Laid-open Publication No. 1998-013719 and Korean Patent Laid-open Publication No. 2008-0093733. Furthermore, the aromatic hydrocarbon resin may include Hikotack P-110S, Hikotack P-120, Hikotack P-120HS, Hikotack P-120S, Hikotack P-140, Hikotack P-140M, Hikotack P-150, Hikotack P-160, Hikotack P-90, Hikotack P-90S, Hirenol PL-1000, Hirenol PL-400, etc. commercially available from Kolon Chemical (Korea). Moreover, the aromatic modified aliphatic hydrocarbon resin may include Hikorez T-1080, Hikorez T-1100, and the like, commercially available from Kolon Chemical (Korea). Also, the hydrogenated hydrocarbon resin can be classified into a hydrogenated aliphatic hydrocarbon resin and a hydrogenated aromatic hydrocarbon resin and may include Sukorez D-300, Sukorez D-390, Sukorez SU-100, Sukorez SU-110, Sukorez SU-120, Sukorez SU-130, Sukorez SU-90, and the like, commercially available from Kolon Chemical (Korea).

In the hot melt adhesive according to the exemplary embodiment of the present invention, preferably, the tackifier is a hydrocarbon resin having 4 to 10 carbon atoms in a monomer and specifically, may include C5 aliphatic resins, C9 aromatic resins, and C5/C9 aliphatic/aromatic copolymer resins.

Further, in the hot melt adhesive according to the exemplary embodiment of the present invention, more preferably, the tackifier is a hydrogenated hydrocarbon resin containing dicyclopentadiene (DCPD) as a monomer and includes Sukorez D-300, Sukorez D-390, Sukorez SU-100, Sukorez SU-110, Sukorez SU-120, Sukorez SU-130, Sukorez SU-90, and the like, commercially available from Kolon Chemical (Korea).

Furthermore, in the hot melt adhesive according to the exemplary embodiment of the present invention, the tackifier may be formed of a rosin-based tackifier, and the rosin-based tackifier may include Komotac KF382S, Komotac KF392S, Komotac KF452S, Komotac KF462S, Komotac KS-2090, Komotac KS-2100, Komotac KS-2110, Komotac KZ223S, Komotac KZ224S, and the like, commercially available from Komo Chemical.

The hot melt adhesive according to the exemplary embodiment of the present invention contains the tackifier in an amount of about 25 to 125 parts by weight, preferably about 50 to 110 parts by weight, and more preferably about 60 to 100 parts by weight with respect to 100 parts by weight of the starch. If the tackifier is contained in an amount of less than 25 parts by weight, a melt viscosity-lowering effect caused by addition of the tackifier may be insignificant, and, thus, workability of the hot melt adhesive may not reach a satisfactory level. If the tackifier is contained in an amount of more than 125 parts by weight, a melt viscosity reduction rate caused by addition of the tackifier is not high, and, thus, economic advantages may deteriorate and the amount of the thermoplastic polymer is relatively decreased, which may deteriorate the overall property of the hot melt adhesive.

Adhesion Promoter

An adhesion promoter is an element to be added to secure improvement in adhesion strength of starch-based hot melt adhesive, which is generally hydrophilic, with respect to a hydrophobic adherend and uniformity in adhesion. In the hot melt adhesive according to the exemplary embodiment of the present invention, the adhesion promoter is not specifically limited in kind as long as it can improve adhesion strength of the starch-based hot melt adhesive with respect to the adherend made of a hydrophobic material such as an acrylonitrile butadiene styrene copolymer (ABS), polypropylene (PP), polyvinylchloride (PVC), and the like, and preferably, may include at least one selected from the group consisting of polyacrylamide, polyvinylamide, polyethyleneimine, epoxidized polyamide, and glyoxylated polyacrylamide.

The hot melt adhesive according to the exemplary embodiment of the present invention contains the adhesion promoter in an amount of about 0.1 to 10 parts by weight, preferably about 0.2 to 5 parts by weight, and more preferably about 0.4 to 2.5 parts by weight with respect to 100 parts by weight of the starch. If the adhesion promoter is contained in an amount of less than 0.1 parts by weight, an adhesion strength improvement effect caused by addition of the adhesion promoter may be insignificant, and, thus, the hot melt adhesive may not uniformly bond different kinds of adherends with satisfactory strength. If the adhesion promoter is contained in an amount of more than 10 parts by weight, an adhesion strength increase rate caused by addition of the adhesion promoter is not high, and, thus, economic advantages may deteriorate and uniformity of the hot melt adhesive in adhesion between the different kinds of adherends may deteriorate.

Further, the adhesion promoter in the hot melt adhesive according to the exemplary embodiment of the present invention may be preferably used in the form of being diluted for uniform mixing with other elements and smooth melting at the time of manufacturing of hot melt adhesive. For example, if polyacrylamide is used as the adhesion promoter, the polyacrylamide is diluted in a dispersion medium such as water and used in the form of a diluted solution containing the polyacrylamide content, that is, solid content, of about 15 to 40 weight %.

Supplement Additive

Preferably, the hot melt adhesive according to the exemplary embodiment of the present invention may further contain a supplement additive in addition to the starch, the plasticizer, the thermoplastic polymer, the tackifier, and the adhesion promoter. Herein, the supplement additive modifies properties of the hot melt adhesive or imparts a specific function to the hot melt adhesive. In the hot melt adhesive according to the exemplary embodiment of the present invention, the supplement additive may be contained in an amount of less than 10 parts by weight with respect to 100 parts by weight of the starch and may include at least one selected from the group consisting of wax, polybutene, oil, filler, and an antioxidant.

The wax is added to lower melt viscosity, improve wetting with respect to a non-polar surface, prevent blocking, and regulate a time for solidification, and specifically, may include paraffin wax or polyethylene wax. The polybutene is added to improve a water-resisting property or impart flexibility. The oil is added to impart flexibility and improve a process such as melting and mixing. The filler refers to a material to be added to prevent aging, reinforce, or increase the quantity in practical use of rubber or plastic, and is used for adjusting the flowability of hot melt adhesive. The filler is not specifically limited in kind and may include, for example, at least one selected from calcium carbonate, clay, bentonite, or calcium stearate. In the case of using a material having a structure which is low in thermo stability and can be easily oxidized, the antioxidant is added to improve a change in viscosity caused by oxidation and decomposition, yellowing, a decrease in adhesion strength, and a decrease in durability. The antioxidant is not specifically limited in kind and specifically, may include phenols, aromatic amines, citric acids, or ascorbic acids.

Further, the hot melt adhesive according to the exemplary embodiment of the present invention is not specifically limited in use, and can be applied to various fields such as, specifically, packaging, bookbinding, construction, woodworking, automobile, textile, and electrical/electronic fields. Depending on its use, the amount of the starch, the amount of the tackifier, and the amount of the adhesion promoter can be adjusted. In particular, the hot melt adhesive according to the exemplary embodiment of the present invention imparts excellent adhesion strength and workability at the time of adhesion between different kinds of adherends such as a hydrophobic adherend and a hydrophilic adherend. Herein, representative examples of the hydrophilic adherend may include wood boards such as a particle board (PB), a medium density fiberboard (MDF), an oriented strand board (OSB), a melamine faced board (MFB), plywood, and the like. Further, a representative example of the hydrophobic adherend may be a finishing material made of a synthetic resin.

Furthermore, the hot melt adhesive according to the exemplary embodiment of the present invention can be manufactured by various methods, for example, melting and mixing with a kneader, and melting and extrusion with an extruder. Herein, a melting temperature is not specifically limited, and the hot melt adhesive can be melted at 110 to 200° C.

Hereinafter, the present invention will be explained in more detail with reference to examples. However, the following examples are provided just for clearly illustrating the present invention without limiting the protective scope of the present invention.

1. Explanation of Analysis Method (1) 180° Peel Shear Adhesion Strength

In order to evaluate 180° peel shear adhesion strength of hot melt adhesive, a cut wood-based particle board and an edge made of an ABS resin (acrylonitrile butadiene styrene copolymer) were bonded to each other with an edge bander as a hot melt adhesive applicator to prepare a bonded specimen. In this case, a working temperature of the hot melt adhesive was about 175 to 180° C. About 24 hours after the bonded specimen was prepared, an average stress for a certain section was measured using an Instron Universal Testing Machine and such measurement was repeated 8 times. An average value thereof was obtained as 180° peel shear adhesion strength. Herein, a load cell and a speed of the Instron Universal Testing Machine were 5 kN and 10 mm/min, respectively.

(2) Melt Viscosity

Melt viscosity of the hot melt adhesive was measured using a Brookfield viscometer (trade name: HBDV-ll+P) equipped with a Thermoset System (thermostatic system). To be specific, 13 ml of the hot melt adhesive in the form of pellets was weighed and put into a sample chamber and completely melted at about 180° C. Melt viscosity was measured using a SC 4-28 spindle.

2. Manufacturing of Hot Melt Adhesive

Manufacturing Example 1

400 g of unmodified corn starch, 100 g of pentaerythritol as a plasticizer, 214 g of an Ethylene Vinyl Acetate (EVA) copolymer as a thermoplastic polymer, 286 g of a hydrogenated aliphatic hydrocarbon resin (product name: Sukorez SU-100, supplier: Kolon Chemical (Korea)) as a tackifier, and 2 g of polyacrylamide as an adhesion promoter were put into a kneader and melt and mixed at 170 to 180° C. so as to manufacture hot melt adhesive.

Manufacturing Example 2

Hot melt adhesive was manufactured in the same manner as Manufacturing Example 1 except that 3 g of 100% polyacrylamide as an adhesion promoter was used.

Manufacturing Example 3

Hot melt adhesive was manufactured in the same manner as Manufacturing Example 1 except that 10 g of 100% polyacrylamide as an adhesion promoter was used.

Manufacturing Example 4

400 g of unmodified corn starch, 100 g of pentaerythritol as a plasticizer, 214 g of an Ethylene Vinyl Acetate (EVA) copolymer as a thermoplastic polymer, 286 g of a hydrogenated aliphatic hydrocarbon resin (product name: Sukorez SU-100, supplier: Kolon Chemical (Korea)) as a tackifier, and 8 g of 25% polyacrylamide as an adhesion promoter were put into a kneader and melt and mixed at 170 to 180° C. so as to manufacture hot melt adhesive. Herein, the 25% polyacrylamide was a polyacrylamide-diluted solution prepared by diluting polyacrylamide with distilled water and adjusting an amount of polyacrylamide to 25 weight %.

Manufacturing Example 5

400 g of unmodified corn starch, 100 g of pentaerythritol as a plasticizer, 214 g of an Ethylene Vinyl Acetate (EVA) copolymer as a thermoplastic polymer, and 286 g of a hydrogenated aliphatic hydrocarbon resin (product name: Sukorez SU-100, supplier: Kolon Chemical (Korea)) as a tackifier were put into a kneader and melt and mixed at 170 to 180° C. so as to manufacture hot melt adhesive.

Manufacturing Example 6

Hot melt adhesive was manufactured in the same manner as Manufacturing Example 4 except that 200 g of unmodified corn starch and 414 g of an Ethylene Vinyl Acetate (EVA) copolymer as a thermoplastic polymer were used.

Manufacturing Example 7

Hot melt adhesive was manufactured in the same manner as Manufacturing Example 5 except that 200 g of unmodified corn starch and 414 g of an Ethylene Vinyl Acetate (EVA) copolymer as a thermoplastic polymer were used.

Manufacturing Example 8

Hot melt adhesive was manufactured in the same manner as Manufacturing Example 4 except that 250 g of unmodified corn starch and 364 g of an Ethylene Vinyl Acetate (EVA) copolymer as a thermoplastic polymer were used.

Manufacturing Example 9

Hot melt adhesive was manufactured in the same manner as Manufacturing Example 5 except that 250 g of unmodified corn starch and 364 g of an Ethylene Vinyl Acetate (EVA) copolymer as a thermoplastic polymer were used.

Manufacturing Example 10

Hot melt adhesive was manufactured in the same manner as Manufacturing Example 4 except that 300 g of unmodified corn starch and 314 g of an Ethylene Vinyl Acetate (EVA) copolymer as a thermoplastic polymer were used.

Manufacturing Example 11

Hot melt adhesive was manufactured in the same manner as Manufacturing Example 5 except that 300 g of unmodified corn starch and 314 g of an Ethylene Vinyl Acetate (EVA) copolymer as a thermoplastic polymer were used.

Manufacturing Example 12

Hot melt adhesive was manufactured in the same manner as Manufacturing Example 4 except that 485 g of unmodified corn starch and 129 g of an Ethylene Vinyl Acetate (EVA) copolymer as a thermoplastic polymer were used.

Manufacturing Example 13

Hot melt adhesive was manufactured in the same manner as Manufacturing Example 5 except that 485 g of unmodified corn starch and 129 g of an Ethylene Vinyl Acetate (EVA) copolymer as a thermoplastic polymer were used.

Table 1 illustrates kinds of elements and amounts thereof used for manufacturing hot melt adhesive in Manufacturing Examples 1 to 13.

TABLE 1

| Category | Starch (g) Unmodified corn starch | Plasticizer (g) Pentaerythritol | Thermoplastic polymer (g) Ethylene vinyl acetate copolymer | Tackifier (g) Sukorez SU-100 | Adhesion promoter (g) 100% polyacrylamide | Adhesion promoter (g) 25% polyacrylamide |
|---|---|---|---|---|---|---|
| Manufacturing Example 1 | 400 | 100 | 214 | 286 | 2 | — |
| Manufacturing Example 2 | 400 | 100 | 214 | 286 | 3 | — |
| Manufacturing Example 3 | 400 | 100 | 214 | 286 | 10 | — |
| Manufacturing Example 4 | 400 | 100 | 214 | 286 | — | 8 |
| Manufacturing Example 5 | 400 | 100 | 214 | 286 | — | — |
| Manufacturing Example 6 | 200 | 100 | 414 | 286 | — | 8 |
| Manufacturing Example 7 | 200 | 100 | 414 | 286 | — | — |
| Manufacturing Example 8 | 250 | 100 | 364 | 286 | — | 8 |
| Manufacturing Example 9 | 250 | 100 | 364 | 286 | — | — |
| Manufacturing Example 10 | 300 | 100 | 314 | 286 | — | 8 |
| Manufacturing Example 11 | 300 | 100 | 314 | 286 | — | — |
| Manufacturing Example 12 | 485 | 100 | 129 | 286 | — | 8 |
| Manufacturing Example 13 | 485 | 100 | 129 | 286 | — | — |

3. Measurement of 180° Peel Shear Adhesion Strength and Melt Viscosity of Hot Melt Adhesive 180° peel shear adhesion strength and melt viscosity of hot melt adhesive manufactured in Manufacturing Examples 1 to 13 were measured by the above-described analysis methods, and results thereof were as illustrated in Table 2 below.

TABLE 2

| Category | Melt viscosity at 180° C. (cPs) | 180° peel shear adhesion strength (kg$_f$) |
|---|---|---|
| Manufacturing Example 1 | 140,000 | 13.3 |
| Manufacturing Example 2 | 120,000 | 11.5 |
| Manufacturing Example 3 | 95,000 | 9.7 |
| Manufacturing Example 4 | 140,000 | 13.7 |
| Manufacturing Example 5 | 130,000 | 9.6 |
| Manufacturing Example 6 | 45,000 | 5.0 |
| Manufacturing Example 7 | 42,000 | 4.5 |
| Manufacturing Example 8 | 53,000 | 6.8 |

TABLE 2-continued

| Category | Melt viscosity at 180° C. (cPs) | 180° peel shear adhesion strength (kg_f) |
|---|---|---|
| Manufacturing Example 9 | 50,000 | 6.0 |
| Manufacturing Example 10 | 85,000 | 7.8 |
| Manufacturing Example 11 | 85,000 | 7.3 |
| Manufacturing Example 12 | 200,000 | 12.8 |
| Manufacturing Example 13 | 180,000 | 12.5 |

As can be seen from Table 2 above, when the adhesion promoter as one of elements of the hot melt adhesive was added, 180° peel shear adhesion strength was increased as compared with a case where the adhesion promoter was not added. In particular, in Manufacturing Example 1 and Manufacturing Example 4, adhesion strength of the hot adhesive was highly increased. Meanwhile, melt viscosity of the hot melt adhesive was increased when the adhesion promoter was added in a small amount, and decreased when the adhesion promoter was added in a certain amount or more, and also rapidly increased as an amount of the starch was increased. When the starch was contained in an amount of less than 25 weight % with respect to the total weight of the hot melt adhesive (Manufacturing Example 6 to Manufacturing Example 9), melt viscosity as an indicator of workability was appropriate but adhesion strength was relatively low, and, thus, the adhesive was not suitable for adhesion between a wood-based particle board as a hydrophilic adherend and an edge (made of an ABS resin) as a hydrophobic adherend. Further, when the starch was contained in an amount of more than 55 weight % with respect to the total weight of the hot melt adhesive, melt viscosity was too high, and, thus, workability is expected to be remarkably poor.

Figure 2:
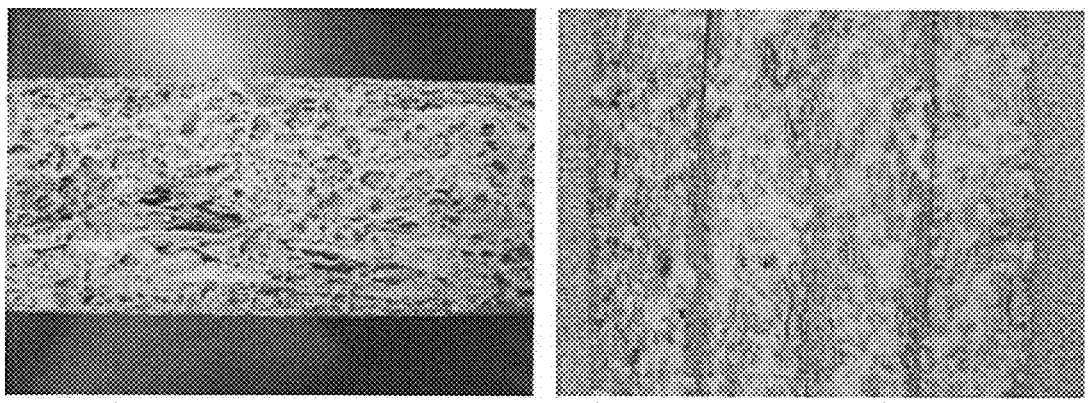
FIG. 2 provides photographs illustrating a status where a wood-based particle board and an ABS edge are bonded to each other with hot melt adhesive manufactured in Manufacturing Example 1 and then peeled off from each other, FIG. 3 provides photographs illustrating a status where a wood-based particle board and an ABS edge are bonded to each other with hot melt adhesive manufactured in Manufacturing Example 2 and then peeled off from each other, FIG. 4 provides photographs illustrating a status where a wood-based particle board and an ABS edge are bonded to each other with hot melt adhesive manufactured in Manufacturing Example 3 and then peeled off from each other, FIG. 5 provides photographs illustrating a status where a wood-based particle board and an ABS edge are bonded to each other with hot melt adhesive manufactured in Manufacturing Example 4 and then peeled off from each other, and FIG. 6 provides photographs illustrating a status where a wood-based particle board and an ABS edge are bonded to each other with hot melt adhesive manufactured in Manufacturing Example 5 and then peeled off from each other.
Figure 3:
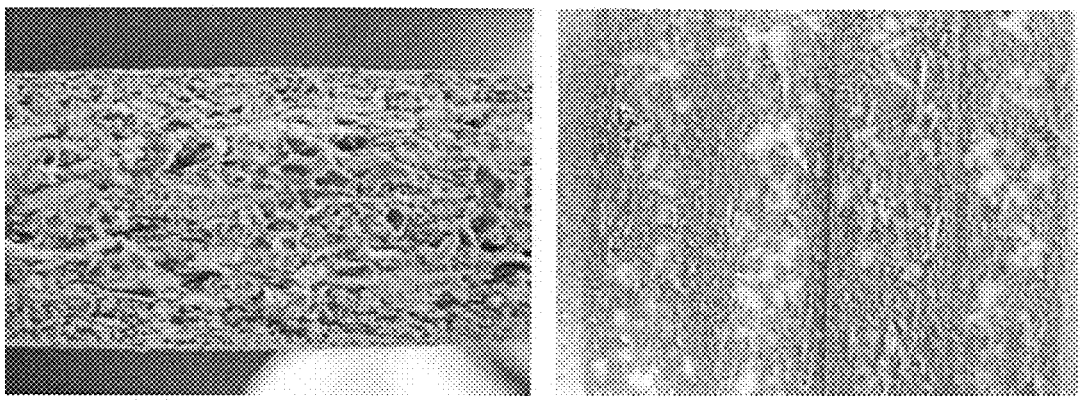
Figure 4:
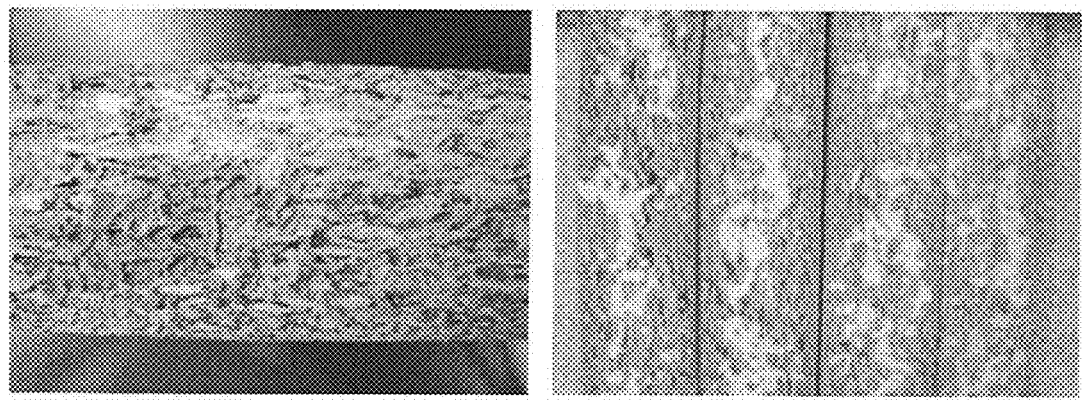
Figure 5:
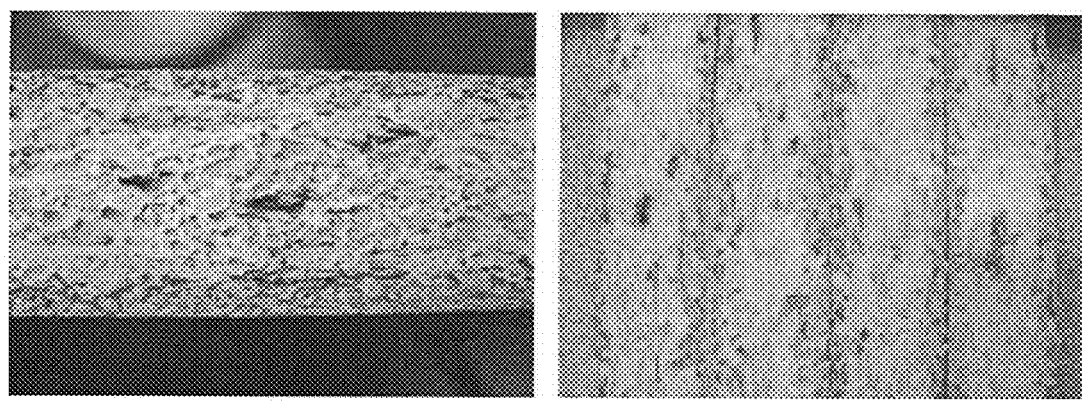
Figure 6:
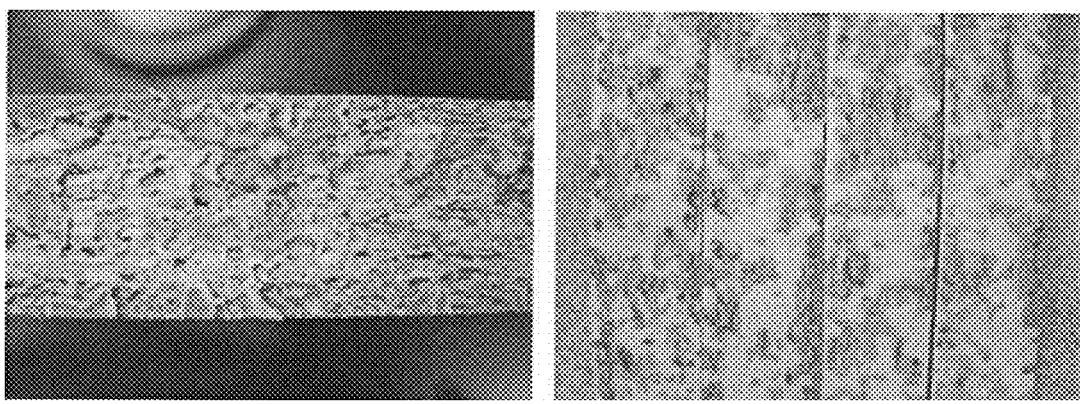

Further, FIG. 2 to FIG. 6 each illustrates a status where a wood-based particle board and an ABS edge are bonded to each other with hot melt adhesive and then peeled off. FIG. 2 provides photographs illustrating a status where a wood-based particle board and an ABS edge are bonded to each other with hot melt adhesive manufactured in Manufacturing Example 1 and then peeled off from each other, FIG. 3 provides photographs illustrating a status where a wood-based particle board and an ABS edge are bonded to each other with hot melt adhesive manufactured in Manufacturing Example 2 and then peeled off from each other, FIG. 4 provides photographs illustrating a status where a wood-based particle board and an ABS edge are bonded to each other with hot melt adhesive manufactured in Manufacturing Example 3 and then peeled off from each other, FIG. 5 provides photographs illustrating a status where a wood-based particle board and an ABS edge are bonded to each other with hot melt adhesive manufactured in Manufacturing Example 4 and then peeled off from each other, and FIG. 6 provides photographs illustrating a status where a wood-based particle board and an ABS edge are bonded to each other with hot melt adhesive manufactured in Manufacturing Example 5 and then peeled off from each other. In FIGS. 2 to 6, the left photo shows a wood-based particle board and the right photo shows an ABS edge. In FIG. 2 to FIG. 6, whether or not the wood-based particle board and the ABS edge are uniformly bonded to each other can be determined by a distribution of residual starch-based hot melt adhesive remaining on an adherend surface of the ABS edge. As illustrated in FIG. 2 to FIG. 6, the starch-based hot melt adhesive without containing the adhesion promoter has a relatively very small amount of residual starch-based hot melt adhesive remaining on the hydrophobic ABS edge (right photograph of FIG. 6), and, thus, it can be seen that adhesion is not uniform.

Although the present invention has been explained with reference to Examples described above, the present invention is not limited thereto and can be modified and changed in various ways without departing from the spirit and scope of the present invention. Therefore, the protective scope of the present invention should be construed as including all examples falling within the appended claims.

The invention claimed is:

1. A starch-based hot melt adhesive comprising:
a composition including starch, a thermoplastic polymer, a tackifier, a plasticizer, and an adhesion promoter,
wherein the starch is contained in an amount of 25 to 55 weight % with respect to the total weight of the composition;
the thermoplastic polymer is contained in an amount of 20 to 150 parts by weight with respect to 100 parts by weight of the starch and is an Ethylene Vinyl Acetate (EVA) copolymer;
the tackifier is contained in an amount of 25 to 125 parts by weight with respect to 100 parts by weight of the starch;
the plasticizer is contained in an amount of 10 to 40 parts by weight with respect to 100 parts by weight of the starch; and
the adhesion promoter is contained in an amount of 0.1 to 10 parts by weight with respect to 100 parts by weight of the starch and is polyacrylamide.

2. The starch-based hot melt adhesive of claim 1, wherein the composition further includes a supplement additive, and the supplement additive is contained in an amount of less than 10 parts by weight with respect to 100 parts by weight of the starch and is wax.

3. The starch-based hot melt adhesive of claim 1, wherein the starch is unmodified starch.

4. The starch-based hot melt adhesive of claim 1, wherein the tackifier is a hydrogenated hydrocarbon resin.

5. The starch-based hot melt adhesive of claim 4, wherein the tackifier is a hydrogenated hydrocarbon resin having 4 to 10 carbon atoms in a monomer.

6. The starch-based hot melt adhesive of claim 5, wherein the tackifier is a hydrogenated hydrocarbon resin containing dicyclopentadiene (DCPD) as a monomer.

7. The starch-based hot melt adhesive of claim 1, wherein the plasticizer is pentaerythritol.

8. The starch-based hot melt adhesive of claim 2, wherein the wax is paraffin wax.

9. The starch-based hot melt adhesive of claim 2, wherein the starch is unmodified starch.

10. The starch-based hot melt adhesive of claim 2, wherein the tackifier is a hydrogenated hydrocarbon resin.

11. The starch-based hot melt adhesive of claim 10, wherein the tackifier is a hydrogenated hydrocarbon resin having 4 to 10 carbon atoms in a monomer.

12. The starch-based hot melt adhesive of claim 11, wherein the tackifier is a hydrogenated hydrocarbon resin containing dicyclopentadiene (DCPD) as a monomer.

* * * * *